July 31, 1951 — E. DURAND ET AL — 2,562,304

AUTOMATIC FREQUENCY CONTROL SYSTEM

Filed Oct. 3, 1945

INVENTOR.
ERIC DURAND
LOWELL M. HOLLINGSWORTH
BY
William D. Hall
ATTORNEY

Patented July 31, 1951

2,562,304

UNITED STATES PATENT OFFICE 2,562,304

AUTOMATIC FREQUENCY CONTROL SYSTEM

Eric Durand and Lowell M. Hollingsworth, Cambridge, Mass., assignors, by mesne assignments, to the United States of America as represented by the Secretary of War Application October 3, 1945, Serial No. 620,132

5 Claims. (Cl. 250—36)

This invention relates in general to electrical circuits and more specifically to a system for automatic frequency stabilization of oscillators and similar apparatus.

In many types of radio object locating devices it is necessary to control the frequency of local oscillators so that the intermediate frequency, resulting from mixing the local oscillator with the signal, will be constant. The frequency of the local oscillator tends to change because of variations in the load, in the temperature of the apparatus, and other factors. It is sometimes desirable to change the frequency of the signal, thereby necessitating a change in frequency of the local oscillator so that the intermediate frequency will remain the same as before.

The change in local oscillator frequency must be a rapid one, as in many radio object locating devices the signal consists of recurring pulses of extremely short duration. When the local oscillator is producing such a frequency that the intermediate frequency is not the desired frequency, a complete pulse or chain of pulses may be lost by attenuation unless an immediate change of frequency of the local oscillator is made.

It is an object of this invention to provide a means which will automatically stabilize the frequency of a local oscillator.

A second object is to provide a means for stabilizing an I.-F. voltage.

Another object is to provide a means such that if the device fails to control the local oscillator frequency the control will be established.

It is a further object of this invention to provide a system which will control the local oscillator frequency in accordance with either the sum or difference sideband frequency at the option of the user to insure the best operation of the local oscillator when using the device to control an intermediate frequency.

Generally, this invention consists of a discriminator connected to a trigger circuit. The output voltage of the trigger circuit is positive or negative depending upon which tube of the trigger circuit is conducting. This voltage is used to change the frequency of the oscillator. During normal operation, with control established, the trigger circuit alternates rapidly between its two stable conditions. If, however, control is lost, the output voltage will be constant and after a specified time, a relay circuit operates a motor to again restore the oscillator to the proper frefuency, at which time the control circuit resumes control.

Other objects, features and advantages of this invention will suggest themselves to those skilled in the art and will become apparent from the following description of the invention taken in connection with the accompanying drawings in which.

Figures 1, 2:
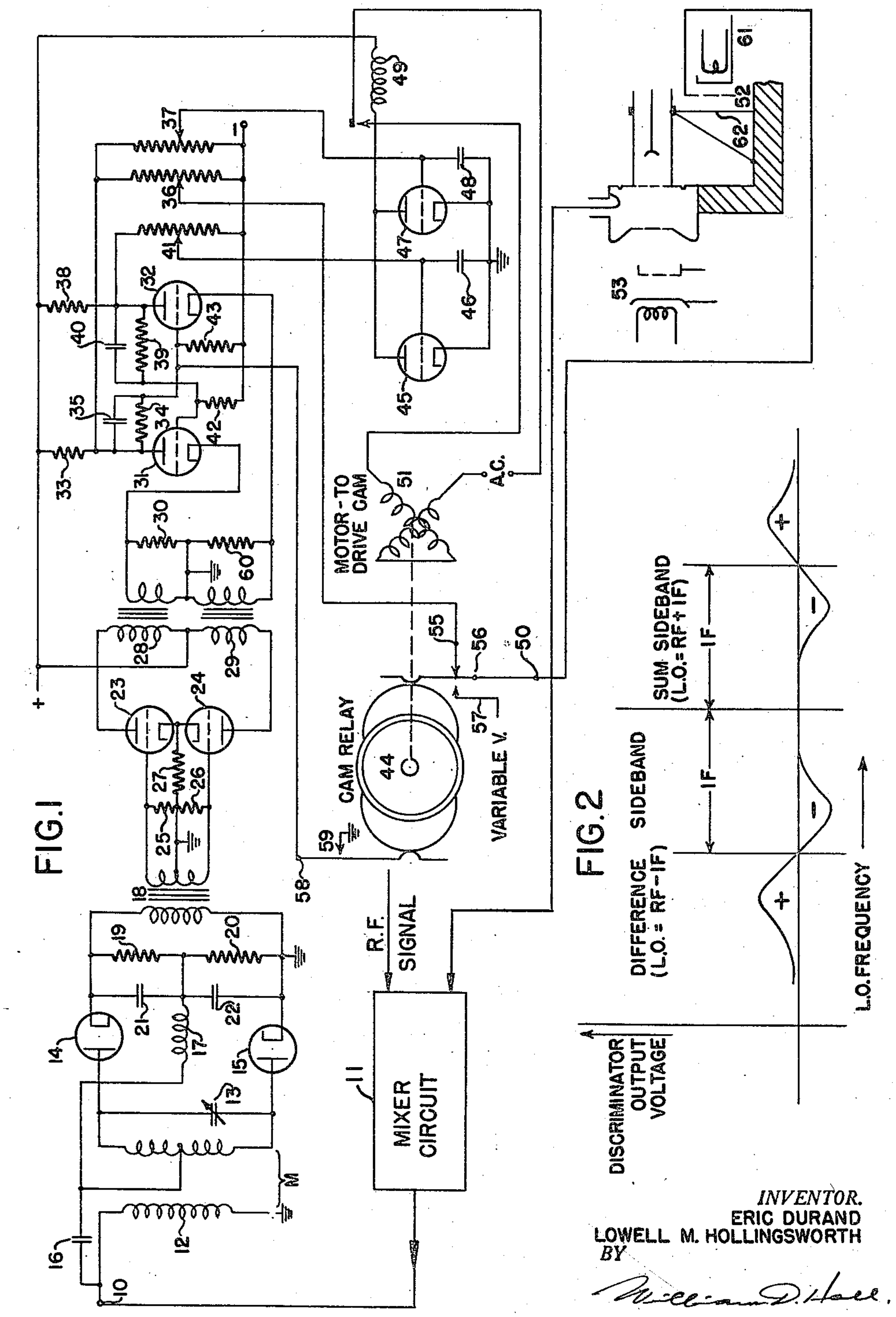
Fig. 1 is a circuit diagram embodying the principles of this invention.
Fig. 2 is a graph which represents the voltage output of the frequency discriminator with respect to the frequency of the local oscillator.

Referring now more particularly to Fig. 1, the mixer 11 is connected to terminal 10 of the primary of transformer 12. The secondary of transformer 12 is connected across capacitor 13 and to the plates of diodes 14 and 15. Terminal 10 is also connected through capacitor 16 to a center tap of the secondary of transformer 12 and to one side of choke 17. The cathodes of diodes 14 and 15 are connected together by the primary of transformer 18. Resistors 19 and 20 are connected in series across the primary of transformer 18. Capacitors 21 and 22 are also connected in series across the primary of transformer 18. The junction of resistors 19 and 20 is connected to the junction of capacitors 21 and 22 and then to choke 17.

The secondary of transformer 18, the center point of which is grounded, is connected between the grids of tubes 23 and 24. Resistors 25 and 26 are connected in series between the grids of tubes 23 and 24. The junction of resistors 25 and 26 is grounded. The cathodes of tubes 23 and 24 are connected together and through resistor 27 to ground. Two terminals of the primary sides of transformers 28 and 29 are joined and supplied by a positive voltage. A second terminal of the primary winding of transformer 28 is connected to the plate of tube 23. Similarly the remaining terminal of the primary winding of transformer 29 is connected to the plate of tube 24. Across the secondary of transformer 28 is resistor 30. Similarly across the secondary of transformer 29 is resistor 60. One side of resistor 30 and resistor 60 is connected to ground. The other side of resistor 30 is connected to the cathode of tube 31. Similarly the ungrounded terminal of resistor 60 is connected to the cathode of tube 32. The plate of tube 31 is connected through resistor 33 to a positive voltage and is also connected through resistor 34, which is shunted by capacitor 35 to the grid of tube 32. A further connection from the plate of tube 31 is made to potentiometer 36 and 37. The plate of tube 32 is connected through resistor 38 to a positive voltage, and is also connected through resistor 39, which is shunted by capacitor 40, to the grid of tube 31. A further connection is made from the plate of tube 32 to potentiometer 41. The grid of tube 31 is connected through resistor 42 to a negative voltage and the grid of tube 32 is connected through resistor 43 to a negative voltage. A negative voltage is also applied to one terminal of potentiometers 36, 37, and 41. The grid of tube 32 is also connected to terminal 58 of motor-driven cam relay 44. In certain positions of the cam of relay 44 the grid of tube 32 will be grounded by coming in contact with terminal 59.

The variable tap of potentiometer 41 is connected to the grid of tube 45 and through capacitor 46 to ground. The variable tap of potentiometer 37 is connected to the grid of tube 47 and through capacitor 48 to ground. The cathodes of tubes 45 and 47 are grounded. The plates of tubes 45 and 47 are connected together and through the winding of relay 49 to a positive voltage. The variable tap of potentiometer 36 is connected to terminal 55 on relay 44. Output terminal 50 is connected to terminal 56 on relay 44. Terminal 57 of relay 44 is connected to a voltage whose magnitude may be variable. An A.-C. motor 51 is mechanically connected to relay 44. One terminal of relay 49 is connected to the A.-C. motor. The remaining terminal of relay 49 is connected to an alternating voltage supply. The second terminal of an alternating voltage supply is connected directly to the A.-C. motor winding.

Output terminal 50 is connected to grid 52 which controls the current flow from cathode 61 to strut 62. Strut 62 is connected to the cavity resonator of oscillator tube 53. Strut 62 is heated by the current passing through it and is arranged to expand or contract with changes in temperature. Expansion or contraction of strut 62 alters the cavity resonator and changes the frequency of the oscillator.

In operation, the I.-F. voltage whose frequency is to be controlled is applied to terminal 10 by mixer 11. This I.-F. voltage is obtained by heterodyning a radio frequency voltage with the output of the local oscillator 53, which is connected to mixer 11. Diodes 14 and 15, operating in conjunction with the connected apparatus, produce a voltage output in transformer 18, the polarity and magnitude of which is a function of the frequency of the incoming voltage in relation to the frequency of the tuned circuit consisting of transformer 12 and capacitor 13. This is conventional discriminator action, the operation of which is explained on pages 585, 586, and 587 of the "Radio Engineer's Handbook" by F. E. Terman, published by McGraw-Hill Book Company, Inc., in 1943.

The output of transformer 18 is applied to the grid of tubes 23 and 24. Tubes 23 and 24 are used as a push-pull amplifier to amplify the voltage produced by the discriminator. The output of said amplifier is applied in a push-pull manner to the cathode of the trigger circuit tubes 31 and 32 by the secondary windings of transformers 28 and 29. The trigger circuit, consisting of tubes 31 and 32 and accompanying resistors and capacitors, will thus operate as a function of the output of the push-pull amplifier consisting of tubes 23 and 24. A rise in the cathode potential of tube 31 will accompany a lowering of the cathode potential of tube 32. Thus, tube 32 will conduct heavily and tube 31 will be cut off as in conventional trigger circuit action. A further increase in the potential of the cathode of tube 31 will be accompanied by a further decrease of the potential of cathode of tube 32. This action will tend to make tube 32 conduct more heavily and will not change the setting of the trigger circuit. Thus it is seen that only a change of polarity of the cathode trigger will reverse the setting of the trigger circuit.

The output of the trigger circuit is applied across potentiometers 36, 37, and 41. The changing voltage from potentiometer 41, produced by tube 32, is applied to the grid of tube 45. Similarly, the changing voltage from potentiometer 37, produced by tube 31, is applied to the grid of tube 47.

Tubes 31 and 32 conduct alternately and when the frequency of tube 53 is being controlled the changes will be quite rapid. When the frequency of tube 53 is not being controlled either the plate of tube 31 or the plate of tube 32 will be at nearly the same potential as the supply voltage. Through potentiometers 37 and 41 this voltage is applied to the grid of tubes 47 and 45, respectively. The potentiometer which has the maximum voltage is adjusted so that relay 49 closes reliably. The same is then done with the trigger circuit reversed so that in either position the relay will be closed.

When controlling the frequency of tube 53, the voltages on potentiometers 37 and 41 vary in value as the tubes 31 and 32 conduct alternately. These voltages are smoothed out by capacitors 46 and 48 so that average values are applied to the grids of tubes 45 and 49. The average voltage values are less than the maximum so that relay 49 will be open, as the sum of the current through tubes 45 and 49 will be less than when the trigger circuit remains static for some length of time.

When relay 49 is closed, the timing motor 51 will have voltage applied to it, causing the cam relay 44 to rotate. High and low points on the cam are made such that if the motor runs continuously, the heating and cooling time of strut 62 will be sufficiently long that tube 53 will sweep through the desired frequency range. The trigger circuit is sensitive to signals only when the tube 53 is sweeping in the desired direction. Fig. 1 shows the cam 44 in position so that the flip-flop is sensitive. Terminal 50 is connected through terminals 55, 56, to potentiometer 36 so that the control voltage of the strut 52 comes from the trigger circuit. If the cam rotates to the insensitive position terminal 58 will come in contact with terminal 59, causing the grid of tube 32 to be grounded. This makes it impossible for pulses to have any effect on the trigger circuit. The grounding of the grid of tube 32 insures that the trigger circuit will be in condition so that potentiometer 36 will have a maximum voltage on it when the trigger circuit is again made sensitive by the ungrounding of terminal 58. The grounding of the grid of tube 32, by rendering the trigger circuit 31, 32 insensitive to discriminator 23, 24, further insures that the tubes 45 and 46 will hold the relay 49 closed and permit the motor 51 to rotate cam 44 until terminals 56 and 58 are returned to their normal positions. The rotation of the cam is slow enough to allow the strut 62 to cool to a limiting value. When terminals 56 and 58 are returned to their normal positions the strut 62 is heated and the oscillator frequency decreases until it brings the I. F. into the range of the discriminator and stops motor 51.

When terminal 58 is grounded, terminal 56 is operated so that terminal 50 is connected through terminals 56 and 57 to a source of variable voltage. This voltage can be adjusted to any desired value so that when the trigger circuit is insensitive, the frequency of tube 53 will be swept back to the desired value.

The position of the contact on potentiometer 36 is such that when the maximum voltage is applied to potentiometer 36 by the trigger circuit, the strut 62 will have its maximum power dissipation.

In general, the output voltage is used to control the current passing through strut 62 mounted with the local oscillator tube. An increase or decrease of the current passing through said strut causes it to expand or contract and thus varies the capacitance of the oscillator's cavity thereby changing the frequency of oscillation. Fig. 2, showing discriminator voltage versus local oscillator frequency, illustrates the operating principles of this circuit. Whether the intermediate frequency is too high or too low is indicated by the polarity of the output voltage from the discriminator. The design allows for the elimination of either the sum or the difference sideband ($F_{LO}=F_{Sig}\pm F_{I-F}$). Since the multivibrator has two stable conditions, when one plate has been lowered in potential and the other raised, one tube will remain conducting and the other nonconducting until an opposite polarity cathode trigger occurs. Thus, if the discriminator indicates the I.-F. is too low, the multivibrator will be triggered and will adjust the thermal control so as to change the local oscillator frequency, and this change continues until the I.-F. is too high, at which time the discriminator will produce a trigger of opposite polarity. This back and forth type of control is one of the unique aspects of this circuit.

Fig. 2 represents the output of the discriminator as a function of the local oscillator frequency. The first curve is produced when the local oscillator frequency is approximately equal to the radio frequency minus the intermediate frequency. The curve on the right is produced when the local oscillator frequency is approximately equal to the radio frequency plus the intermediate frequency. Assuming that a voltage of positive polarity from the discriminator will cause the local oscillator frequency to increase, and conversely negative voltage from the discriminator will cause the local oscillator to decrease, it will be seen that only one trap, where the frequency is held betwen opposite polarities, exists for the local oscillator frequency. If it is desirable to have the trap about the right curve of Fig. 2 instead of the first curve, a reversal of the thermal control at the trigger circuit will produce this effect.

The heating element used to change the frequency has an averaging effect and is thus a long time constant heating device. The short time constant electrical device used in this circuit to control the heating device does not allow an undesirable hunting effect to occur due to the difference in time constants.

If the discriminator has not yet gained control to keep the local oscillator within the abovementioned trap, as during the warming-up operation of the apparatus, means are supplied to bring the frequency of the local oscillator under the control of the discriminator. It is also possible, due to abnormal operating conditions for the discriminator to lose control of the local oscillator frequency. Therefore, if the discriminator does not produce a voltage polarity change causing the trigger circuit to operate, the output at terminal 50 will be changed to a different potential by relay 44 as previously explained.

While there has been described hereinabove what is at present considered to be a preferred embodiment of this invention, it will be obvious to those skilled in the art that various changes and modifications may be made therein without departing from the scope of the invention as set forth in the appended claims.

The invention claimed is:

1. An automatic frequency control system for maintaining an input frequency at a desired frequency level, comprising means for varying said input frequency, normally inoperative control means coupled to said frequency-varying means for effecting a sweep of said input frequency over a predetermined band of frequencies which includes said desired frequency level, frequency discriminating means for producing an output of a first polarity when said input frequency is within a first small range of frequencies immediately above said desired frequency level and for producing an output of opposite polarity when said input frequency is within a second small range of frequencies immediately below said desired frequency level, a circuit connected to said discriminating means having two alternative stable outputs, said circuit assuming a first stable output in response to said first polarity output being applied thereto and assuming a second stable output in response to said opposite polarity being applied thereto, means for applying the output of said circuit to said frequency-varying means for effecting a varition of said input frequency toward said desired frequency level from one direction in response to said first output and a variation of said input frequency toward said desired frequency level from the opposite direction in response to said second output, and time-delay means coupling said circuit to said control means for rendering said control means operative in response to said circuit maintaining either one of said two stable outputs for more than a predetermined time, due to said input frequency being outside of said first or second ranges of frequency, whereby said control means brings said input frequency within said first or second frequency ranges.

2. In combination, an oscillator tube including thermal means for controlling its frequency, a discriminator circuit for receiving the oscillator frequency said discriminator circuit being tuned to a predetermined frequency to produce an output of one polarity if the oscillator frequency is above said predetermined frequency and of the opposite polarity if the oscillator frequency is below said predetermined frequency, a trigger circuit including first and second electronic discharge devices for receiving the output of said discriminator circuit and arranged so that one of said electronic discharge devices conducts when the output of said discriminator circuit is one of polarity and the other of said electronic discharge devices conducts when the output of said discriminator is of another polarity, means for passing current through said thermal means when one of said electronic discharge devices conducts and for preventing current from passing through said thermal means when the other of said electronic discharge devices conducts.

3. In combination, an oscillator tube including thermal means for controlling its frequency, a discriminator circuit coupled to the oscillator, said discriminator circuit being tuned to a predetermined frequency to produce an output of one polarity if the oscillator frequency is above said predetermined frequency and of the opposite polarity if the oscillator frequency is below said predetermined frequency, a trigger circuit including first and second electronic discharge devices for receiving the output of said discriminator circuit and arranged so that the first electronic discharge device conducts when the output of said discriminator circuit is of one polarity and the second electronic discharge device conducts when the output of said discriminator is of another polarity, means for passing current through the thermal means in response to conduction of the first electronic discharge device and stopping the passage of current through the thermal means in response to the conduction of the second electronic discharge device third and fourth electronic discharge devices; means whereby said third electronic discharge device conducts when said first electronic discharge device conducts and whereby said fourth electronic discharge device conducts when said second electronic discharge device conducts but whereby either the third or fourth electronic discharge device conducts heavily if either the first or second electronic discharge devices conduct continuously for more than a predetermined period of time, means whereby when either said third or fourth electronic discharge devices conducts sufficiently, current is not passed through said thermal device for a predetermined period of time and after said predetermined period of time the first and second electronic discharge devices are placed in such state of conductivity that current does flow through said thermal device.

4. An automatic frequency control system for a radio receiver having a given intermediate frequency, comprising a mixer circuit having an intermediate frequency output, a local oscillator connected to said mixer having means for varying the frequency thereof, a frequency discriminator connected to said mixer, which is effective over a limited frequency range in the vicinity of said given intermediate frequency, for producing an output voltage having characteristics which are a function of the relationship of the intermediate frequency output of said mixer relative to said given intermediate frequency, a circuit connected to said discriminator which is arranged to be responsive to the characteristics of said output voltage in a manner such that said circuit produces a first stable output when the intermediate frequency of said mixer is larger than said given intermediate frequency and produces a second stable output when the intermediate frequency of said mixer is smaller than said given intermediate frequency, means for applying the output of said circuit to the frequency-varying means of said oscillator, said frequency-varying means being arranged so that said first output initiates a change in frequency of said oscillator in one direction and said second output initiates a change in the opposite direction to thereby maintain the local oscillator at the frequency required to produce said given intermediate frequency at said mixer output with a minimum amount and magnitude of frequency hunting, and normally inoperative control means coupled between said circuit and said frequency-varying means, which is rendered operative in response to said circuit maintaining either one of said two stable outputs for more than a predetermined time, for effecting a frequency sweep of said oscillator to bring the intermediate frequency output of said mixer within the effective frequency range of said discriminator.

5. The automatic frequency control system described in claim 4 wherein said frequency-varying means is a cavity resonator provided with a movable wall, a strut having one end connected to said movable wall and its other end fixed, and the output of said circuit generates a current through at least a portion of said strut and controls the amount of said current in response to the first and second output of said circuit being different from each other so as to cause thermal expansion or contraction of said strut, to thereby adjust the movable wall of said cavity resonator.

ERIC DURAND.
LOWELL M. HOLLINGSWORTH.

REFERENCES CITED

The following references are of record in the file of this patent:

UNITED STATES PATENTS

| Number | Name | Date |
|---|---|---|
| 1,907,132 | Thurston | May 2, 1933 |
| 2,044,749 | Usselman | June 16, 1936 |
| 2,267,453 | Foster | Dec. 23, 1941 |
| 2,286,396 | Trevor | June 16, 1942 |
| 2,374,810 | Fremlin | May 1, 1945 |
| 2,384,379 | Ingram | Sept. 4, 1945 |
| 2,434,294 | Ginzton | Jan. 13, 1948 |
| 2,462,856 | Ginzton | Mar. 1, 1949 |
| 2,476,311 | Learned | July 19, 1949 |